United States Patent [19]

Kim et al.

[11] Patent Number: 5,276,727
[45] Date of Patent: Jan. 4, 1994

[54] REMOTE MAINTENANCE METHOD AND DEVICE THEREOF IN PRIVATE BRANCH EXCHANGE SYSTEM

[75] Inventors: Yang-Seon Kim; Chang-Lae Jeong; Seung-Hwan Cho, all of Seoul, Rep. of Korea

[73] Assignee: SamSung Electronics, Co. Ltd., Suwon, Rep. of Korea

[21] Appl. No.: 814,609

[22] Filed: Dec. 30, 1991

[30] Foreign Application Priority Data

Jun. 24, 1991 [KR] Rep. of Korea .............. 1991-10497
Aug. 14, 1991 [KR] Rep. of Korea .............. 1991-14082
Nov. 25, 1991 [KR] Rep. of Korea .............. 1991-21146

[51] Int. Cl.⁵ .................................................. H04M 3/22
[52] U.S. Cl. ........................................ 379/29; 379/14; 379/15
[58] Field of Search ............... 379/10, 11, 9, 19, 29, 379/15, 14

[56] References Cited

U.S. PATENT DOCUMENTS 4,972,453 11/1990 Daniel, III et al. .................. 379/10

Primary Examiner—Curtis Kuntz
Assistant Examiner—Paul Loomis
Attorney, Agent, or Firm—Robert E. Bushnell

[57] ABSTRACT

A method and device for maintaining a PBX system by connecting the PBX system with a remote maintenance center 220 through a public switch telephone network (PSTN), a method for transmitting a state information of the PBX system to the remote maintenance by connecting a remote maintenance connection circuit automatically in case of the PBX system receiving an incoming call from the remote maintenance center, and a MODEM control circuit 302 for communicating the state information with an external device 220 by utilizing the MODEM 303 built in the system without using a separate port, are disclosed.

9 Claims, 8 Drawing Sheets

| LTD7 | LTD6 | LTD5 | LTD4 | LTD3 | LTD2 | LTD1 | LTD0 |
|------|------|------|------|------|------|------|------|

NOT USED (LTD7, LTD6, LTD5)

FIG. 4C

| LSB7 | LSB6 | LSB5 | LSB4 | LSB3 | LSB2 | LSB1 | LSB0 |
|------|------|------|------|------|------|------|------|

NOT USED (LSB7, LSB6, LSB5)

FIG. 4D

REMOTE MAINTENANCE METHOD AND DEVICE THEREOF IN PRIVATE BRANCH EXCHANGE SYSTEM

BACKGROUND OF THE INVENTION

The present invention relates to a private branch exchange (PBX) system, and more particularly to a method and device for maintaining the PBX system by establishing a data communication path between a remote maintenance center and the PBX system through a public switching telephone network (PSTN).

With reference to FIG. 1, a central processing unit (hereinafter called as CPU) 101 controls an overall operation of the PBX system so as to perform a variety of functions and establish a speech path.

A memory 102 comprises a ROM for storing a program and initial service data to generate a basic call and perform all kinds of functions of the PBX system and a RAM for storing temporarily data generated while performing the program under control of the CPU 101.

An interface circuit 103 is connected between the CPU 101 and various structural elements of the PBX system and interfaces all kinds of signals and data generated while performing an exchange function of the PBX system. A switch circuit 104 exchanges all kinds of tone signals, dialing data and voice data through a channel designated by a control of the CPU.

An extension circuit 105 is connected between the switch circuit 104 and a subscriber telephone set 111, establishes an extension speech loop under a control of the CPU 101, supplies an electric current to the telephone set 111, and interfaces all kinds of state signals and voice signals between the switch circuit 104 and the subscriber telephone 111 or 111'.

A general office line circuit 106 is connected between the switch circuit 104 and the PSTN, establishes an office line speech loop by seizing an office line under a control of the CPU 101, transmits all kinds of state signals and voice signals received from the office line to the switch circuit 104, and in turn transmits the voice signal and state signal from the switch circuit 104 to the office line.

A DID (Direct Inward Dialing) office line circuit 107 is connected between the switch circuit 104 and the PSTN, connects a call signal to the subscriber 111 directly according to a dialing signal from the office line by seizing a DID trunk under a control of the CPU 101, and interfaces all kinds of signals and voice signals between the DID trunk and the switch circuit 104.

A DTMF (Dual Tone Multi Frequency) reception circuit 108 is connected to the switch circuit 104, converts a received dialing signal into a digital data and transmits it to the CPU 101. A tone generating circuit 109 is connected to the switch circuit 104 and transmits a designated tone signal to the switch circuit 104 under a control of the CPU 101. An input/output circuit 110 is connected to an external terminal 112 and printer 113 and interfaces data between the external terminal and the PBX system under the CPU 101.

A key telephone system may be used in place of the PBX system as described in the above statement.

Generally a function of maintaining the PBX system is performed by utilizing the telephone set 111 or the terminal 112. If an abnormal state occurs on the PBX system or changing information of the subscriber is required, it is possible to check the abnormal state or change the information of the subscriber by utilizing the telephone set 111 or the terminal 112.

But it is difficult for a system operator or an user to maintain and administrate the PBX system by themselves because an operation of the PBX system is complicated and varied. Accordingly, a technician from the maintenance center must visit a site of the PBX system, in order to inspect the abnormal state and add or delete a function requested by an user.

However it is difficult to satisfy an user's requirement promptly because the technician has to visit the site of the PBX system for maintaining directly, and also it takes much time to maintain because of the abnormal state being inspected on the spot. Furthermore an efficiency of the PBX system is decreased because an operation of the system may be impossible during the maintaining of the PBX system. And the maintenance center should employ a great number of maintenance workers for satisfying various users' requirements.

SUMMARY OF THE INVENTION

It is an object of this invention to provide a method and device for maintaining a PBX system by connecting the PBX system with a remote maintenance center through a PSTN.

It is another object of this invention to provide a method for transmitting a state information of the PBX system to the remote maintenance center by driving a remote maintenance connection circuit automatically equipped with the PBX system in case of the PBX system receiving an incoming call from the remote maintenance.

It is still another object of this invention to provide a modulator-demodulator (MODEM) control circuit for communicating state information with an external device by utilizing a MODEM built in the PBX system without using an additional port.

According to the present invention, a remote maintenance connection device in the private branch exchange (PBX) system comprising: a remote maintenance center connected to a public switch telephone network (PSTN) for diagnosing a state of the PBX system according to reply data received after transmitting inquiry data, and transmitting result data for maintenance and function setting; a controller for controlling a speech function of the PBX system, transmitting the reply data of the state of the PBX system in response to the inquiry data, and setting up a maintenance and a function according to the result data; an office line connection circuit for interfacing with the remote maintenance center by the controller through the PSTN; a switch circuit for establishing a communication path for remote maintenance with the office line connection circuit by the controller; and a remote maintenance connection circuit connected between the switch circuit and the controller for transmitting the inquiry data from the switch circuit to the controller, transmitting the reply data from the controller to the switch circuit, and transmitting the result data from the switch circuit to the controller.

The present invention will now be described more specifically with reference to the drawings attached only by way of example.

BRIEF DESCRIPTION OF THE DRAWINGS

FIGS. 4A to 4D are structural maps of a memory of the present invention; and

DETAILED DESCRIPTION OF THE PREFERRED EMBODIMENT

Figure 1:
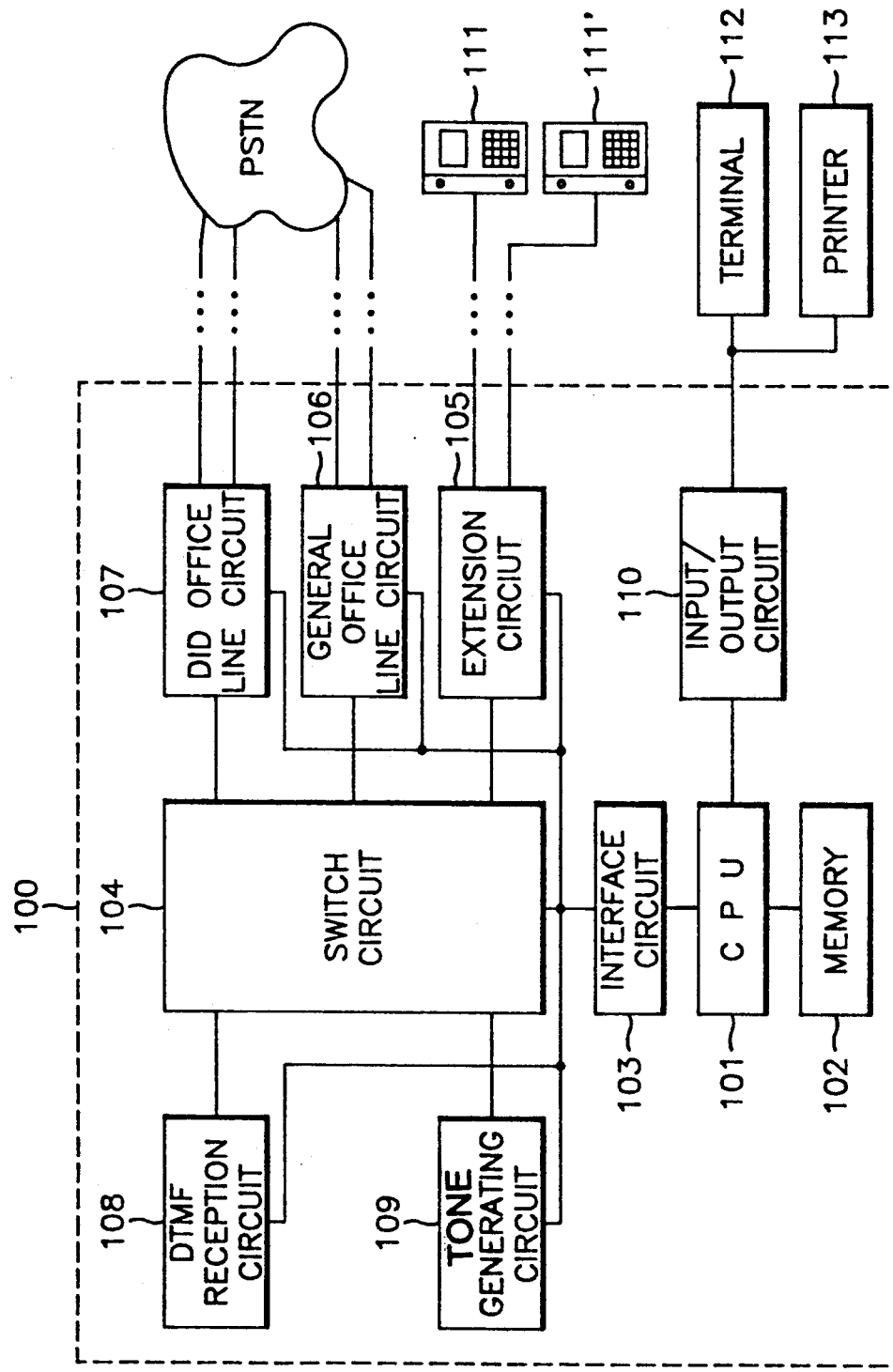
FIG. 1 is a block diagram illustrating a conventional PBX system.
Figure 2:
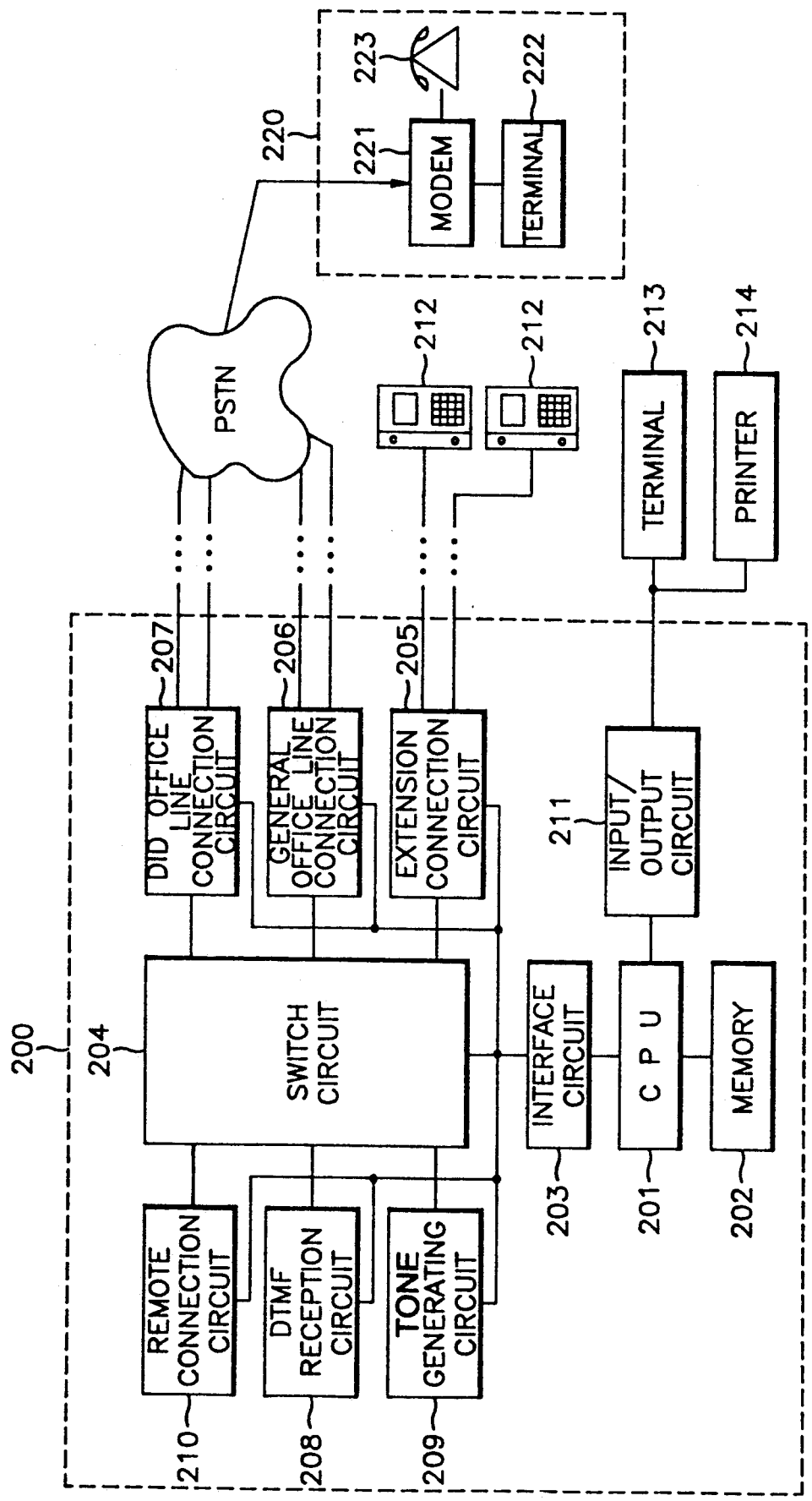
FIG. 2 is a block diagram illustrating the PBX system according to the present invention.

With reference to FIG. 2, a configuration of the inventive PBX system is similar to the conventional PBX system of FIG. 1. In addition to the conventional configuration of the PBX system, a remote maintenance center 220 and a remote maintenance connection circuit 210 are added.

The remote maintenance connection circuit 210 is connected with a switch circuit 204, and establishes a data communication path by a control of a CPU 201, thereby transmitting state information of the PBX system to the remote maintenance center 220 through the switch circuit 204.

Figure 3:
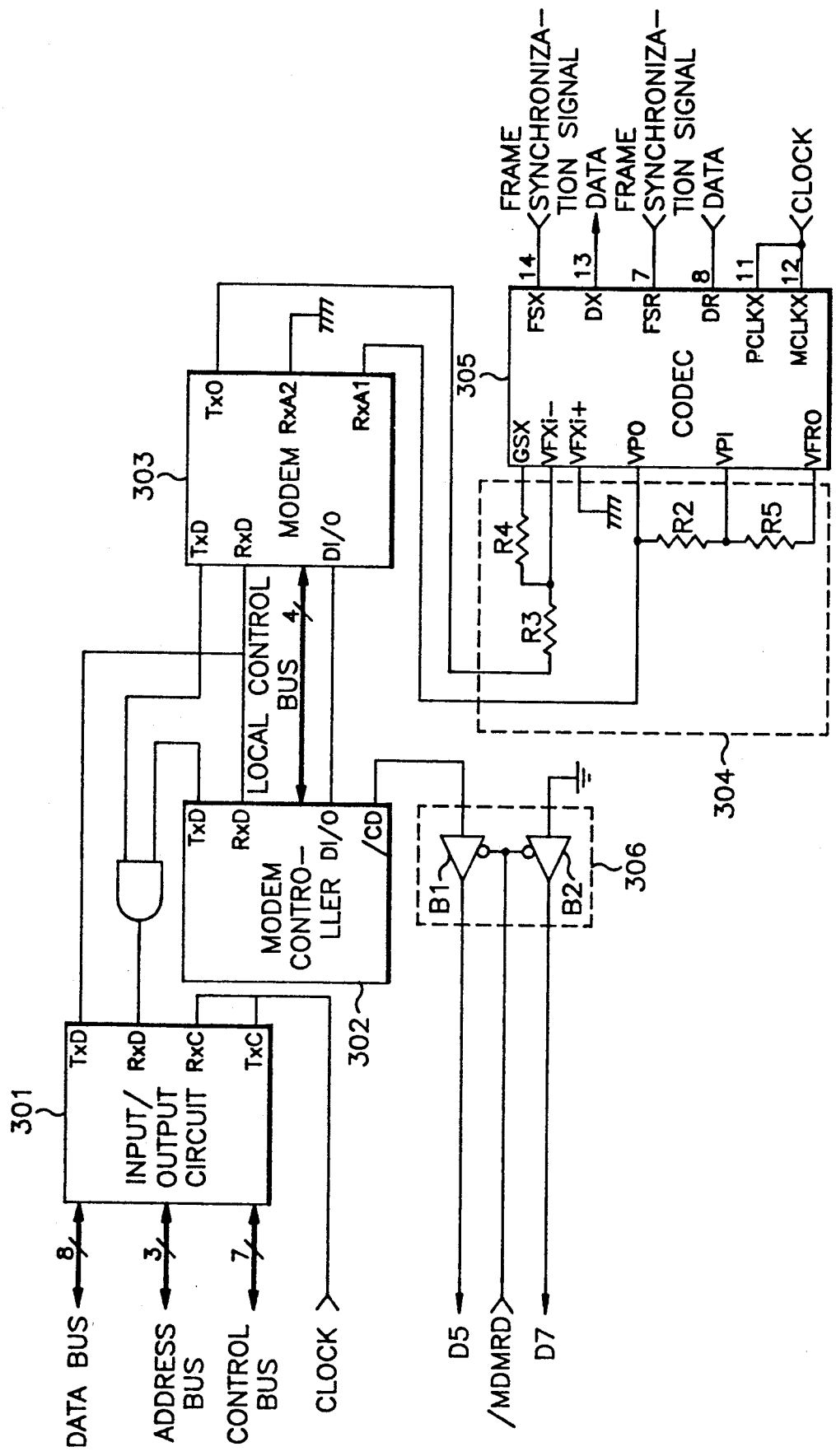
FIG. 3 is a detailed diagram illustrating a remote maintenance connection circuit shown in FIG. 2.

With reference to FIG. 3, a configuration of the remote maintenance connection circuit 210 is illustrated as follows.

An input/output circuit 301 converts parallel data received through a data bus into serial data and vice versa, serial data into parallel data under a control of the CPU 201, and thereafter transmits the converted data to the CPU 201 through the data bus.

A MODEM controller 302 is connected with the input/output circuit 301, receives the serial data from the input/output circuit 301 to analyze, thereby controlling the state of a MODEM 303. The MODEM controller 302 detects a carrier signal received through the MODEM 303, thereby checking a start and termination of data communication.

The MODEM 303 is connected between the input/output circuit 301 and an interface circuit 304, and converts a digital serial data of the input/output circuit 301 into an analog signal and analog serial data into digital data.

A codec 305 is connected between the interface circuit 304 and the switch circuit 204. The codec 305 converts an analog signal of the MODEM 303 into a digital signal, and synchronizes the digital signal with a corresponding time slot, transmitting it to the switch circuit 204. Also the codec 305 converts data of corresponding time slot received from the switch circuit 204 into analog data and transmits it to the MODEM 303.

The interface circuit 304 is connected between the MODEM 303 and the codec 305, and adjusts a data gain and an external impedance.

A buffer part 306 comprising two buffers B1 and B2 buffers a signal received from a carrier detection terminal CD of the MODEM controller 302, and transmits a signal indicative of a presence of carrier signal to the CPU 201 by a MDMRD signal of the CPU 201.

With reference to FIGS. 2 and 3, an outside system operator places a call to an office line connected to a general office line connection circuit 206 or a DID office line connection circuit 207, in order to communicate with the PBX system. Then the general office line connection circuit 206 or the DID office line connection circuit 207 detects an incoming ring signal from the PSTN and transmits it to the CPU 201.

The CPU 201 recognizes the incoming call of the office line and controls the switch circuit 204 so as to establish a speech path. The speech path is established with a telephone set 212 of a called subscriber connected to an extension connection circuit 205 in case of the incoming call being received at the general office line connection circuit 206. And in case of the incoming call being received at the DID office line connection circuit 207 or office line with a DISA (Direct Inward System Access) function, the called subscriber receives a dialing signal by connecting the DTMF reception circuit 208 with the outside system operator.

When the incoming call is received at the general office line connection circuit 206, the CPU 201 supplies a ring signal to the telephone set 212 of the called subscriber. By hooking off, the telephone set 212 receives the incoming ring and is connected to a speech path with an outside subscriber of the office line through the switch circuit 204. Assuming that the outside subscriber is the remote maintenance center 220, the outside subscriber requests to change mode for a remote data communication when the speech path is established.

Accordingly, the CPU 201 connects the incoming call of the general office line connection circuit 206 to the remote connection circuit 210 through the switch circuit 204 when the called subscriber 212 transmits a conversion key signal through the extension connection circuit 205 to the CPU 201.

The CPU 201 controls the switch circuit 204 so as to connect the incoming call of the office line with the remote connection circuit 210 if a direct communication with the remote connection circuit 210 is requested through the DID office line connection circuit 207 or the office line circuit of the DISA function.

After the remote connection circuit 210 is connected with the incoming call, a MODEM 221 of the remote maintenance center 220 is connected with the MODEM 303 of the remote connection circuit 210. Then a communication path is established for performing data communication if the MODEM 303 detects a carrier signal.

When the remote maintenance center 220 puts data for communicating into the MODEM 221 under the detection of a carrier, the MODEM 221 converts the data for communicating to an analog signal and transmits it through the PSTN to the general office line connection circuit 206 or the DID office line connection circuit 207 of the PBX system, by loading it on the carrier.

On the other hand, the general office line connection circuit 206 or the DID office line connection circuit 207 of the PBX system converts the received analog signal into a digital signal and transmits the digital signal to the switch circuit 204 connected to the remote maintenance connection circuit 210. The switch circuit 204 switches the digital signal and applies the switched signal to the remote maintenance connection circuit 210. The remote connection circuit 210 transmits the received digital signal to the CPU 201.

The CPU 201 analyzes the data received from the remote connection circuit 210, producing output data. The output data is transmitted to the remote maintenance center 220 through a transmission path in the opposite direction of a reception path for the incoming call.

With reference to FIGS. 2 and 3, an operation of the remote connection circuit 210 is illustrated in detail as follows.

When the remote connection circuit 210 receives an instruction for mode conversion, the CPU 201 controls the switch circuit 204 so that a communication path is established between the remote connection circuit 210 and the general office line connection circuit 206 or the DID office line connection circuit 207. At this time, the remote connection circuit 210 utilizes a fixed channel. The CPU 201 transmits control data to the input/output circuit 301 through a data bus in order to place the MODEM 303 of the remote connection circuit 210 on-line.

The input/output circuit 301 converts a parallel data transmitted from the data bus to a serial data, which is produced through an output end TXD thereof. The MODEM controller 302 receives the serial data through its input end RXD and analyzes it. The MODEM controller 302 controls the MODEM 303 to be on-line through a local control bus if the received serial data is an on-line data of the MODEM 303. The MODEM controller 302 controls an on/off-line operation and a communication speed of the MODEM 303.

The MODEM controller 302 checks the presence of carrier signal of the MODEM 303, and generates a "low" signal through an end CD when the carrier signal exists.

An output from the carrier detection end CD of the MODEM controller 302 is applied to the buffer part 306. The buffer part 306 transmits the output signal of the carrier detection end CD to the CPU 201 in case of receiving an enabling signal/MDMRD from the CPU 201.

Accordingly the CPU 201 recognizes a start of communication by receiving a carrier detection signal from the buffer part 306 after generating on-line data.

The buffer part 306 comprises a first buffer B1 connected to the end CD of the MODEM controller 302 and a second buffer B2 connected to a ground terminal or an electric source. The first buffer B1 buffers a signal representative of the presence of carrier signal, and the second buffer B2 buffers a signal representative of the relation between the remote connection circuit 210 and the MODEM 303. The outputs of the first and second buffers B1 and B2 are illustrated in Table 1.

TABLE 1

| | OUTPUT | REMARK |
|---|---|---|
| BUFFER 1 | 0 | Carrier signal existed |
| | 1 | Carrier signal not existed |
| BUFFER 2 | 0 | MODEM connected |
| | 1 | MODEM not connected |

When the remote connection circuit 210 is on line and a carrier signal is detected from an outside MODEM, the CPU 20 performs a step of receiving a data from the outside subscriber and analyzing it.

In a step of receiving data, the switch circuit 204 transmits a frame synchronization signal and data to an end FSR and an end DR of the codec 305, respectively. The codec 305 receives a data of corresponding time slot by using a frame synchronization signal FSX and a clock MCLKX, and converts it into an analog signal, producing the output thereof through an end VPO. The signal from the end VPO is applied to an end RXA1 of the MODEM 303 after its gain and impedance is adjusted by a resistances R2 and R5.

The MODEM 303 converts the analog signal received at the end RXA1 into a digital signal, and provides it through an end TxD thereof. The data from the end TxD of the MODEM 303 is transmitted to an end RxD of the input/output circuit 301 and converted into a parallel data. The parallel data of the input/output circuit 301 is transmitted through the data bus to the CPU 201 and is analyzed. Thus, the CPU 201 generates a reply data in response to the received data, checking the state of the MODEM 303.

The MODEM controller 302 analyzes an output received from an end DI/O of the MODEM 303, and transmits it through an end TXD thereof to the end RXD of the input/output circuit 301. The input/output circuit 301 converts serial data of the end RXD thereof into a parallel data and transmits it to the CPU 201. Thereby the CPU 201 analyzes the received parallel data and recognizes the state of the MODEM 303.

As described in the above statement, the CPU 201 generates the reply data by analyzing data received from an outside subscriber. At this time, the CPU 201 transmits the reply data through the data bus to the input/output circuit 301. The input/output circuit 301 converts the received parallel data into a serial data, transmitting the serial data through an end TXD thereof according to a clock. The clock decides a transmission speed of the serial data, of which speed is as same as a transmission speed of the MODEM 303.

An output of the end TXD of the input/output circuit 301 is applied to the end RXD of the MODEM controller 302 and the MODEM 303. The MODEM 303 converts the received serial digital data into an analog signal. The serial analog data of the end TXO is transmitted to the end GSX of the codec 305 after its gain and impedance is adjusted by resistances R3 and R4.

The codec 305 converts the serial analog signal received through the end GSX into a digital signal, and generates the converted digital signal through an end DX by loading it on a corresponding time slot. An output data of the codec 305 is transmitted to the switch circuit 204 and switched into a time slot of an outside subscriber. The switched data is transmitted to the outside subscriber through the general office line connection circuit 206 or the DID office line connection circuit 207.

In brief, the CPU 201 of the PBX system controls the remote connection circuit 210 so as to place the MODEM 303 on-line, and analyzes a data received through the remote connection circuit 210 connected to a communication path of the outside subscriber. And the CPU 201 generates the reply data in response to the received data and transmits it to the remote connection circuit 210. The reply data is transmitted to the outside subscriber through the communication path of the switch circuit 204 and the office line.

If the outside subscriber generates data requiring an interruption of the data communication under the above data communication, the CPU 201 recognizes the data communication interruption through the communication path and controls the MODEM controller 302 to take the MODEM 303 off-line. And if there is occurred an abnormality on a carrier signal during the data communication, the MODEM controller 302 senses an interruption of a carrier signal, and generates a logic signal "high" through the end CD thereof. Then the CPU 201 recognizes a discontinuation of carrier signal, thereby controlling the MODEM controller 302 so as to make the MODEM 303 off-line.

FIGS. 4A to 4D are structures of map of memory 202, wherein the tables of extension and office line subscriber are the same in structure.

Figure 4A:
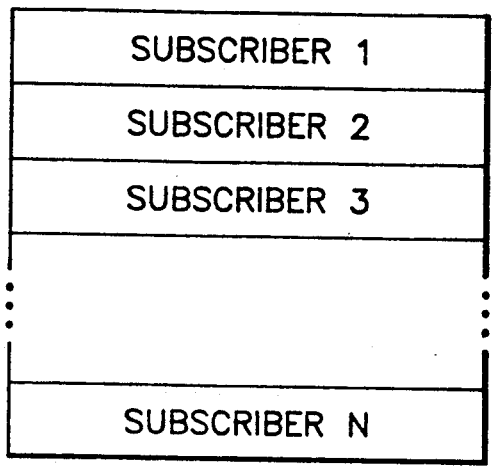
Figure 4B:
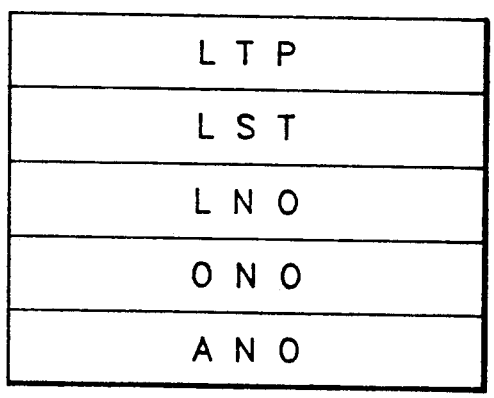

FIG. 4A shows a table structure for N subscribers of the PBX system, and FIG. 4B shows details of table structure of one subscriber. FIG. 4C shows a structural map of bits of Line Type as shown in FIG. 4B and a function of bits is described in the table 2.

TABLE 2

| | Whether it is an extension subscriber. |
|---|---|
| LTD0 (STATION) | 0 Otherwise |
| | 1 Extension subscriber |
| | Whether it is a DID office line. |
| LTD1 (DID-CO) | 0 Otherwise |
| | 1 DID office line |
| | Whether it is a DISA office line. |
| LTD2 (DISA-CO) | 0 Otherwise |
| | 1 DISA office line |
| | Whether it is a general office line. |
| LTD3 (NORMAL-CO) | 0 Otherwise |
| | 1 General office line |
| | Whether it is a MODEM port for a remote maintenance. |
| LTD4 (MODEM) | 0 Otherwise |
| | 1 MODEM subscriber |

FIG. 4D shows a structural map of bits of Line Status and a function of bits is described in the table 3.

TABLE 3

| | Whether a subscriber is idle. |
|---|---|
| LSD0 (IDLE) | 0 Otherwise |
| | 1 Idle |
| | Whether a subscriber hears a busy tone. It is set under all states except for an idle state. |
| LSD1 (BUSY) | 0 Otherwise |
| | 1 Busy |
| | Whether a call is ringing |
| LSD2 (RING) | 0 Otherwise |
| | 1 Ring |
| | Whether a subscriber hears a ring back tone. |
| LSD3 (RING BACK) | 0 Otherwise |
| | 1 Ring back. |
| | Whether a subscriber talks with other subscriber |
| LSD4 (TALK) | 0 Otherwise |
| | 1 Taking |
| | Whether a subscriber hears a hold tone. |
| LSD5 (HOLD) | 0 Otherwise |
| | 1 Hold |

With reference to FIG. 4B, a subscriber's identification number is stored in a port of line number LNO, and a number of an opposite party on telephone is stored in a port of opposite number ONO. A number of extension subscriber for receiving an incoming ring is stored in a port of answer number ANO when the general office line connection circuit 206 receives the incoming ring.

Figure 5A:
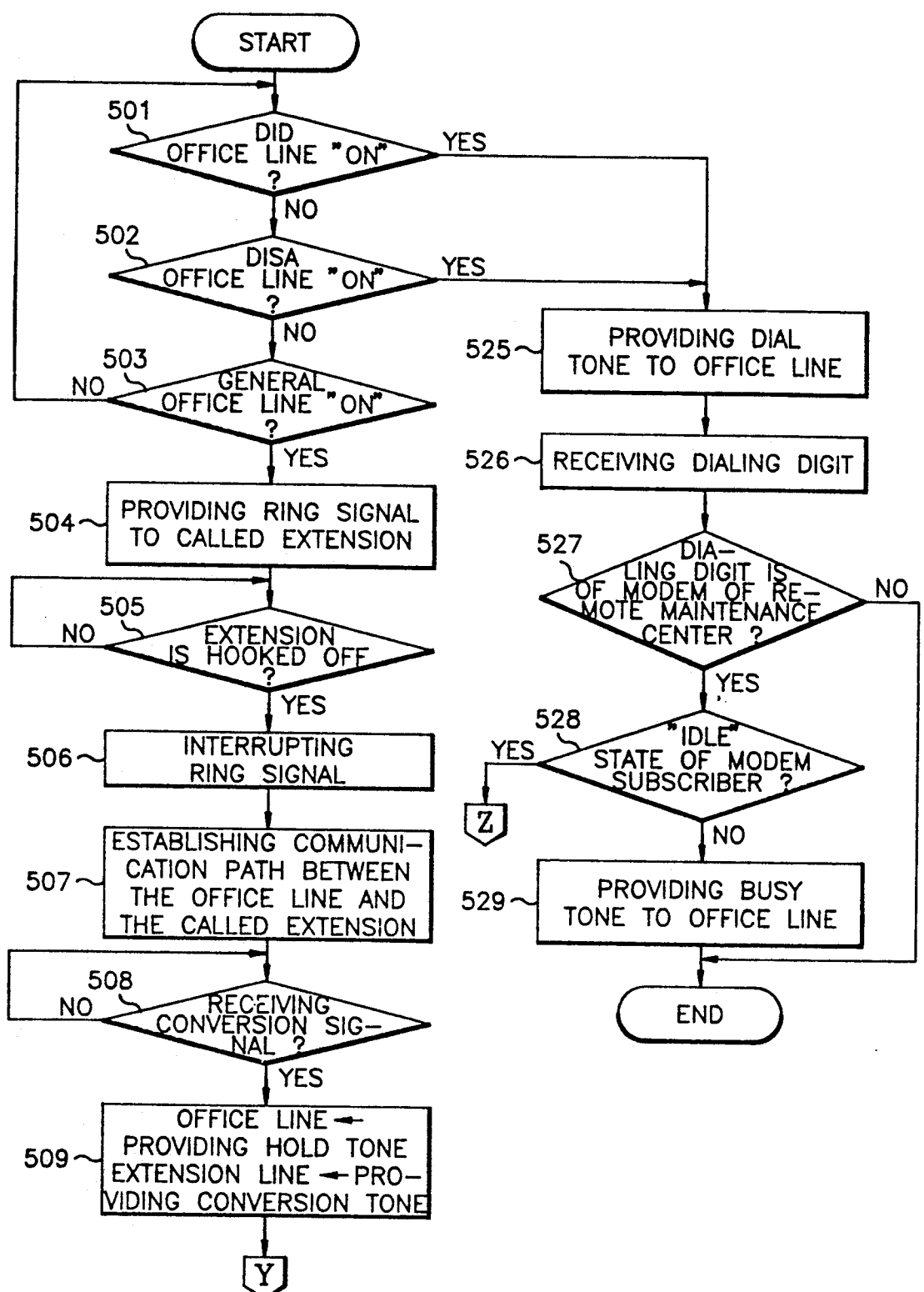
FIGS. 5A, 5B, and 5C are a flow chart illustrating a remote maintenance operation according to the present invention
Figure 5B:
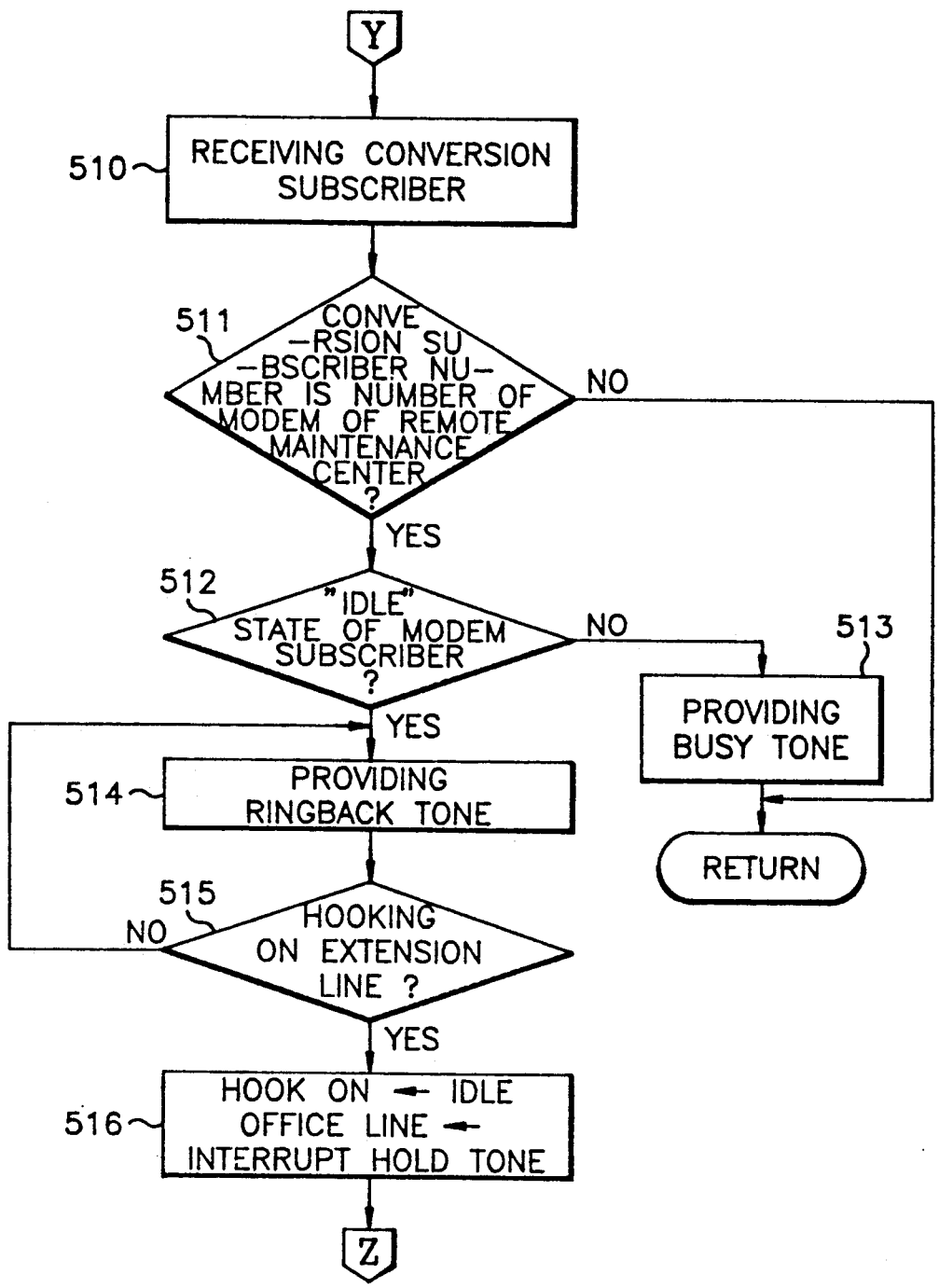
Figure 5C:
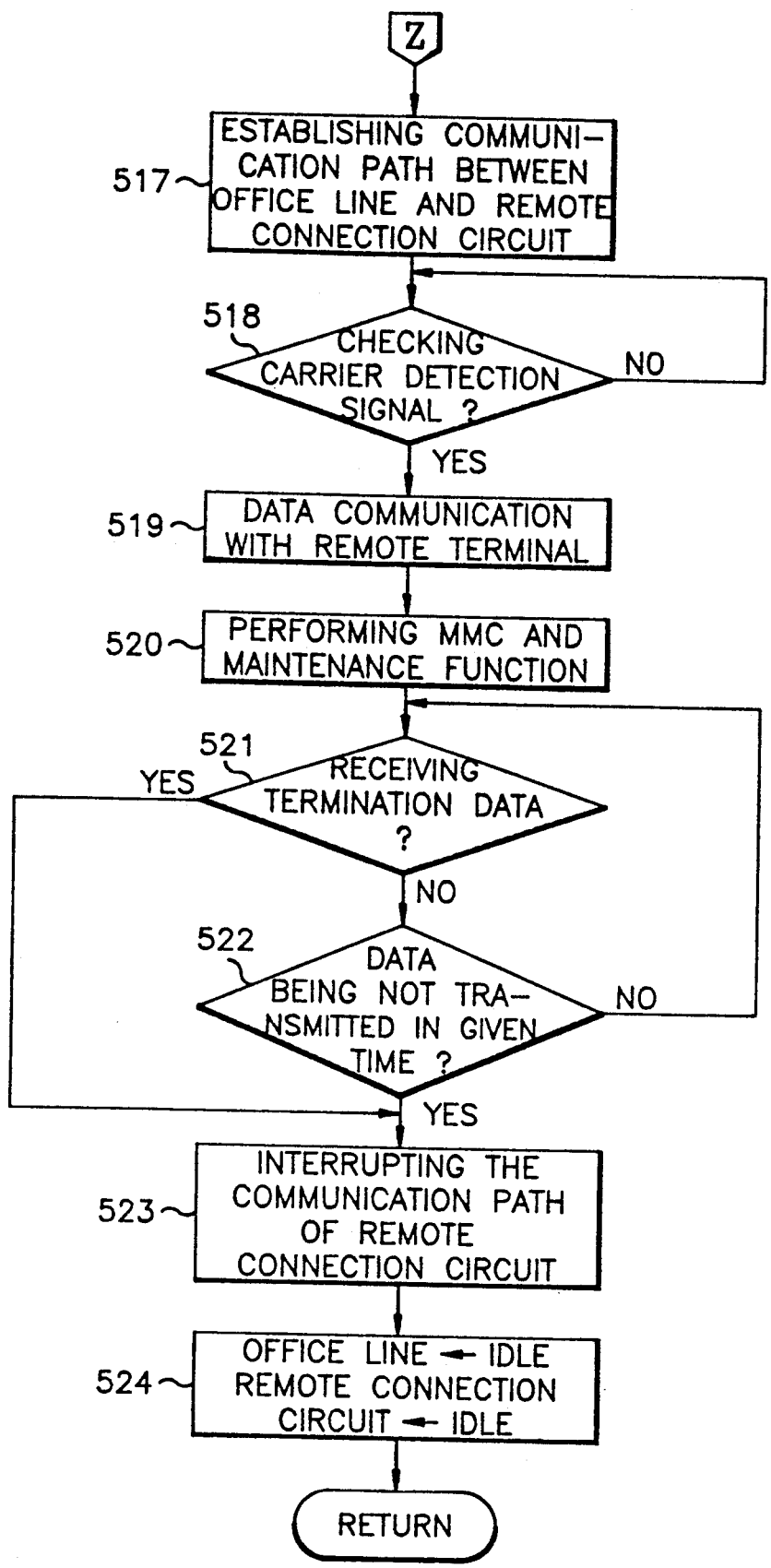

FIGS. 5A, 5B and 5C show a step of connecting the remote maintenance center with the remote connection circuit 210. The connection step comprises three kinds of steps to be adapted in case of the general office line connection circuit 206 receiving the incoming ring, the DID office line connection circuit receiving the incoming ring and the office line of the DISA function receiving the incoming ring. A details of the three kinds of steps is illustrated in FIGS. 5A, 5B, and 5C.

The step of establishing a communication path between the remote maintenance center 220 and the PBX system is described more specifically as follows.

Firstly a step of performing a maintenance through the general office line connection circuit 206 is described.

When the general office line connection circuit 206 receives the incoming ring signal, the CPU 201 recognizes a reception of the incoming ring signal in the step of 503. In the step 504, the incoming ring signal is supplied to a called extension subscriber recorded in the port of answer number ANO, a LSD0 bit of line status of subscriber LST is reset, and a LSD1 and a LSD2 bit is set, so that the called extension subscriber is set in a talking status and a state of supplying the ring signal is indicated.

Thereafter the CPU 201 checks whether the port of the called extension subscriber is hooked off by inspecting a state of port of the called extension subscriber in the extension connection circuit 205. When the port of the called extension subscriber is hooked off, the CPU 201 interrupts the ring signal in the step of 506. And then the CPU 201 establishes a speech path between an incoming port of the general office line connection circuit 206 and the port of the called extension subscriber of the extension connection circuit 205 by controlling the switch circuit 204 in the step of 507. And the LSD2 bit of the line status LST is reset so as to indicate a state of cancellation of ring signal, and LSD4 bit is set so as to indicate a state of talking. An office line number is recorded in an opposite number port of the called extension subscriber table, and the called extension number is recorded in an opposite number port of the office line subscriber table.

Accordingly a speech path is established between the office line and the extension line. When the office line subscriber announces himself as the remote maintenance center 220 and request to be connected with the remote connection circuit 210, the called extension subscriber dials a conversion key and an ID number of the remote connection circuit 210.

The CPU 201 recognizes a reception of the conversion key in the step of 508, and controls the switch circuit 204 in the step of 509 so as to provide a hold tone or music to the remote maintenance center 220 in the state of talking and to provide a conversion tone to the called extension subscriber.

Thereafter, when a conversion subscriber number is put in the extension connection circuit 205, in the step of 510, the CPU 201 receives the conversion subscriber number through the DTMF reception circuit 208 and stores it in an opposite number port ONO of FIG. 4B.

In the step of 511, the CPU 201 checks whether the conversion subscriber number is a subscriber number of the MODEM 303 for receiving a remote maintenance. The checking is done by inspecting a LTD4 bit of line type port LTP after accessing the conversion subscriber table. If the LTD4 bit is set, the conversion subscriber is a subscriber of the MODEM 303.

In a step of 512, the CPU 201 checks a state of LSD0 bit of conversion subscriber table as shown in FIG. 4D after confirming the conversion subscriber number is the subscriber number of the MODEM 303 for receiving the remote maintenance in the step of 511 If the LSD0 bit is reset as a state of "Otherwise" as shown in Table 3, the CPU 201 controls the tone generating circuit 209 and the switch circuit 204 so as to send a busy tone to the called subscriber in a step of 513.

If the LSD0 bit is set as a state of "Idle" in the step of 512, the CPU 201 controls the tone generator 209 and the switch circuit 204, providing a ring back tone to the called extension subscriber and setting a LSD3 bit of line status as shown in FIG. 4D in a step of 514.

Consequently the incoming call from the remote maintenance 220 is connected with the remote connection circuit 210 by the called extension subscriber. Accordingly, when the called extension subscriber hooks on his telephone set, the CPU 201 recognizes a state of hook-on through the extension connection circuit 205 in a step of 515, and sets the called extension subscriber in a state of "Idle" and interrupts the hold tone being sent to the office line subscriber in a step of 516. In the line status LST of the extension subscriber table as shown in FIG. 4B, a LSD0 bit is set, a LSD1 to LSD5 bits are reset, and a FFH is stored in an opposite subscriber number port of the extension subscriber table. Thereby the remote maintenance connection circuit is initialized.

In a step of 517, the CPU 201 controls the switch circuit 204 so as to connect the remote connection circuit 210 with the incoming office line port, and accordingly a communication path between the maintenance center 220 and the remote connection circuit 210 is established by using the PSTN. In this case, a LSD5 bit is reset and a LSD4 is set in a line status of the office line subscriber table, and a LSD4 bit is set as a state of "talking" in a line status of a subscriber of the remote connection circuit 210. A number of the remote connection circuit 210 is stored in an opposite subscriber number port of the office line subscriber table, and a number of the office line subscriber is stored in an opposite subscriber number port of the subscriber table of the remote connection circuit 210.

After the communication path for maintenance is established, a data communication is performed in order to set up a MODEM and to form communication path between the MODEM 221 of the remote maintenance center 220 and the MODEM 303 of the remote connection circuit 210.

The CPU 201 generates the MDMRD signal and enables the first buffer B1, thereby checking a state of carrier detection signal received from the end CD of the MODEM controller 302 in a step of 518. When the carrier signal is detected in the step of 518, the CPU 201 recognizes the establishment of communication path between the MODEM 303 of the remote connection circuit 210 and the MODEM 221 of the remote maintenance center 220, and thereafter performs a function of maintenance in the steps of 519 and 520.

In detail, when the remote maintenance center 220 transmits an inquiry data for inspecting a state of the PBX system to the CPU 201, the CPU 201 generates a reply data in response to the received inquiry data. The remote connection circuit 210 transmits the reply data to the remote maintenance center 220 through the communication path of the switch circuit 204. The remote maintenance center 220 transmits an instruction signal MMC (Man Machine Communication) of maintenance or function change of the PBX system after receiving the reply data. The CPU 201 receives the instruction signal through the remote connection circuit 210, performing the maintenance or the function change After completing the function of maintenance, the remote maintenance center 220 generates a given data such as "+++" representative of a termination of the data communication through a terminal 222, and the CPU 201 recognizes the termination of data communication through the remote connection circuit 210 in a step of 521.

The CPU 201 controls the switch circuit 204, interrupting a connection between the office line port and the remote connection circuit 210 in a step of 523, and resets a LSD0 bit of the office line subscriber and the subscriber of the MODEM 303 in a step of 524. At this time, all speech information recorded in the office line subscriber table and the extension subscriber table of the MODEM 303 are cleared and the steps of remote maintenance are finished.

If the remote maintenance center 220 does not transmit a data for a given time in a step of 522, the steps of 523 and 524 are performed for terminating the step of maintenance.

Secondly the step of maintenance through the DID office line connection circuit 207 is described specifically as follows.

The DID office line connection circuit 207 is an office line for exclusive use of an incoming call. An opposite office line subscriber dials an extension subscriber number together with an office line number of the PBX system, the extension subscriber number being assigned to the called extension subscriber. A LTD1 bit of line type is set for communicating with the DID office line in a subscriber table as shown in FIG. 4C.

When the incoming call signal is received at the DID office line connection circuit 207, the CPU 201 recognizes the DID office line by checking a state of LTD1 bit of line status of the subscriber table as shown in FIG. 4C. That is, when the LTD1 bit is set, the CPU 201 controls the switch circuit 204 so as to supply a dial tone to a receiving side RX of the office line, resets the LSD0 bit a so as to be released from an "idle" state, and sets the LSD1 bit as a "busy" state in a step of 525.

In a step of 526, the CPU controls the switch circuit 204, connecting a transmission side TX of the office line with the DTMF reception circuit 208, and receives a dialing digit through the DID office line.

In a step of 527, the CPU 201 checks whether the received dialing digit is a number of the MODEM 303 of the remote connection circuit 210 for the remote maintenance. Wherein if a LTD4 bit of line type as shown in FIG. 4C is set in an extension subscriber table responding to the dialing digit, the dialing digit is the number of MODEM subscriber for remote maintenance.

After confirming the extension subscriber is the subscriber for the remote maintenance, the CPU 201 checks whether the MODEM 303 is in the "idle" state by inspecting the LSD0 bit of line status of the subscriber table of the MODEM 303 in a step of 528. If the MODEM 303 is in the "busy" state in the step of 528, the CPU 201 sets the LSD1 bit in a line status of the subscriber table as shown in FIG. 4D, and sends a busy tone to the office line in a step of 529 and returns. But if the MODEM 303 is in the "idle" state in the step of 528, the CPU 201 goes back to the step of 517, establishing the communication path for the maintenance and repeats the above described steps consecutively.

Thirdly a function of remote maintenance can be performed in a DISA function through the general office line connection circuit 206. For performing the DISA function, a certain office line of the general office line connection circuit 206 is set with the DISA function. The DISA function can be set through a telephone or a terminal by performing the MMC. The CPU 201 sets the LTD2 bit of line type of the office line subscriber table such as FIG. 3 so as to record the certain office line of the office line circuit as the DISA office line port.

Thereafter, if the remote maintenance center 220 accesses the DISA office line of the general office line connection circuit 206 through the PSTN, the CPU 201 recognizes a state of the DISA office line port of the general office line connection circuit 206 in the step of 502. Accordingly the CPU 201 performs the steps of 525 to 529 in the same way as the DID office line when the incoming call signal is received through the DISA office line port.

In conclusion, it is possible to cope with a user's requirement rapidly by checking a state of the PBX system and performing a maintenance with a telephone of remote distance in the PBX system. A cost of maintenance is reduced because it is not necessary for a technician to visit a site of the PBX system.

Furthermore, when the PBX system is connected with a remote maintenance MODEM, an extension port is saved because a MODEM actually connected with the remote maintenance MODEM is built in the PBX system. It is not necessary for the remote maintenance MODEM to adopt a ring detector because the PBX system is connected with the remote maintenance MODEM after establishing an extension speech path. Also a data communication is performed by the system in itself when a remote maintenance center requests a MODEM communication with the PBX system. As a result, an efficiency of the PBX system is advanced.

While the present invention has particularly shown and described with reference to the preferred specific embodiment thereof, it will be apparent to those who skilled in the art that the foregoing changes in form and detail may be made without departing from the spirit and scope of the present invention.

What is claimed is:

1. A remote maintenance device of a private branch exchange system, said device comprising:
   a remote maintenance center connected to a public switch telephone network, for generating inquiry data to said private branch exchange system, receiving reply data in response to said inquiry data, thereby diagnosing said private branch exchange system according to said reply data, and thereafter for generating result data indicative of controlling of a maintenance function of said private branch exchange system;
   controlling means for controlling a speech function of said private branch exchange system for transmitting said reply data to said remote maintenance center, and for setting up said maintenance function of said private branch exchange system according to said result data;
   office line connection means for interfacing said remote maintenance center with said controlling means through said public switch telephone network;
   switch means for establishing a data communication path between said remote maintenance center and said office line connection means under control of said controlling means; and
   remote maintenance connection means connected between said switch means and said maintenance means, for transmitting said inquiry data from said switch means to said controlling means, in turn transmitting said replay data from said controlling means to said switch means, and for transmitting said result data of said switch means to said controlling means,
   wherein said remote maintenance connection means comprises:
      input/output circuit means for converting parallel data and serial data received through a data bus into serial data and parallel data, respectively, and thereafter producing converted serial and parallel output data through said data bus;
      MODEM means receiving the converted serial output data from said input/output means, for converting said converted serial output data of a digital form into serial analog data, for converting an analog signal applied thereto into a digital signal and for, transmitting said digital signal to said input/out means;
      MODEM controlling means receiving said serial output data from said input/output means, for adjusting a state of said MODEM means, for analyzing MODEM data of said MODEM means and thereafter transmitting analyzed MODEM data of said MODEM means to said input/output means, and for checking a state of carrier signal of said MODEM means;
      codec means receiving said serial analog signal from said MODEM means, for converting said serial analog signal into a digital transmit signal and thereafter for transmitting said digital transmit signal to said switch means in a given time slot, and receiving received transmitted data of given time slot from said switch means, for converting said transmitted data into analog data and thereafter transmitting said analog data to said MODEM means; and
      buffer means for buffering a signal of a carrier output from said MODEM controlling means and transmitting the buffered signal to said controlling means according to a control of said controlling means.

2. A device as claimed in claim 1, further comprising an interface circuit connected between said MODEM means and said codec means, for adjusting a gain and an impedance of a signal applied to or generated from said codec means.

3. A method for remotely maintaining a private branch exchange system by data communication between a remote maintenance center and said private branch exchange system through a public switch telephone network, said private branch exchange system having a remote maintenance connection circuit connected between an exchange controller and a switch circuit, said method comprising:
   analyzing incoming information received through an office line connection circuit, controlling said switch circuit, and establishing a data communication path between said remote maintenance connection circuit and an incoming port of a corresponding office line of said office line connection circuit;
   transmitting response data representative of a state of said private branch exchange controller in response to inquiry data generated at said remote maintenance center, generating result data in response to said inquiry data, and performing a maintenance function in dependence upon said result data; and
   controlling said switch circuit when a termination signal representative of a communication end is generated during the maintenance operation, thereby interrupting said data communication path, and initializing said remote maintenance connection circuit;

wherein said establishing data communication path comprises:

when receiving said incoming information at a general office line connection circuit of said office line connection circuit, connecting a speech path between said general office line connection circuit and a called extension subscriber, and thereafter if conversion data is received from said called extension subscriber for said remote maintenance connection circuit, establishing said data communication path between a port of said general office line connection circuit and said remote maintenance connection circuit;

when receiving said incoming information at a direct inward system access office line port of said office line connection circuit, analyzing a continuously received dialing digit of said direct inward system access office line port, and thereafter establishing said data communication path between said remote maintenance connection circuit and said direct inward system access office line port in accordance with an analyzed output of said dialing digit; and when receiving said incoming information at a direct inward dialing office line connection circuit of said office line connection circuit, analyzing a continuously received dialing digit of said direct inward dialing office line connection circuit, and thereafter establishing said data communication path between said remote maintenance connection circuit and said direct inward dialing office line connection circuit in accordance with an analyzed output of said dialing digit of said direct inward dialing office line connection circuit.

4. A private branch exchange system having a remote maintenance capability, said system comprising:

controlling means for controlling in overall operation of said private branch exchange system, for receiving inquiries from a remote maintenance center through a public switch telephone network, for generating replies to said inquiries to be provided to said remote maintenance center through said public switch telephone network, and for controlling maintenance functions of said private branch exchange system in response to results generated by said remote maintenance center by diagnosing said private branch exchange system according to analysis of said replies;

switching means for establishing a data communication path between said remote maintenance center and said controlling means through said public switch telephone network;

input/output means for receiving said replies as output parallel bus data from said controlling means, for converting said output parallel bus data to output serial local bus data, for receiving said inquiries and said results as input series local bus data, and for converting input serial local data to input parallel bus data to be provided to said controlling means;

means for receiving and modulating said output serial local bus data to generate output analog data signals, and for receiving and demodulating input analog data signals to generate said input serial local bus data; and codec means for receiving and converting said output analog data signals to output digital data signals and transmitting said output digital data signals to said switching means in a selected time slot, and for receiving input digital data signals of a given time slot and for converting said input digital data signals to said input analog data signals received by said modulating and demodulating means.

5. A system as claimed in claim 4, further comprising modulation/demodulation control means for controlling a state of said modulating and demodulating means, and for generating data receipt signals indicative of said modulating and demodulating means detecting a carrier signal.

6. A system as claimed in claim 5 further comprising buffer means for buffering said data receipt signals to provide to said controlling means from said modulation/demodulation control means.

7. A method for remotely maintaining a private branch exchange system by data communication between a remote maintenance center and said private branch exchange system through a public switch telephone network, said private branch exchange system comprising a remote maintenance connection circuit, said method comprising:

receiving inquiries from said remote maintenance center at a general office line connection circuit of an office line connection circuit, establishing a speech path between a general office line connection circuit and a called extension subscriber, and if conversion signals are received from said called extension subscriber to said remote maintenance connection circuit, establishing said data communication path between a port of said general office line connection circuit and said remote maintenance connection circuit, and analyzing said inquiries;

transmitting responses indicative of a state of said private branch exchange system to said remote maintenance center;

generating results in response to said responses, transmitting said results to said private branch exchange system and enabling a maintenance function of said private branch exchange system in dependence upon said results; and controlling said switch circuit when a termination signal representative of a communication end is generated during the maintenance operation, thereby interrupting said data communication path, and initializing said remote maintenance connection circuit.

8. A method as claimed in claim 7, further comprising receiving said inquiries at a direct inward system access office line port of said office line connection circuit, analyzing dialing digits of said direct inward system access office line port, and establishing said data communication path between said remote maintenance connection circuit and said direct inward system access office line port in accordance with said dialing digits.

9. A method as claimed in claim 7, further comprising receiving incoming information at a direct inward dialing office line connection circuit of said office line connection circuit, analyzing receiving dialing digits of said direct inward dialing office line connection circuit, and establishing said data communication path between said remote maintenance connection circuit and said direct inward dialing office line connection circuit in accordance with said dialing digits of said direct inward dialing office line connection circuit.

* * * * *

UNITED STATES PATENT AND TRADEMARK OFFICE
CERTIFICATE OF CORRECTION

PATENT NO. : 5,276,727
DATED : January 4, 1994
INVENTOR(S) : Yang-Seon Kim; et al.

It is certified that error appears in the above-indentified patent and that said Letters Patent is hereby corrected as shown below:

Column 5,   Line 53,   Change "CPU 20" to --CPU 201-- .

Column 11,  Line 64,   Change "maintenance" to --controlling-- ;

Column 12,  Line 61,   After "exchange", Insert --system to said exchange-- ;

Column 13,  Line 41,   After "controlling", Change "in" to --an-- ;

Column 14,  Line 61,   Change "receiving" to --received-- .

Signed and Sealed this

Eleventh Day of October, 1994

Attest:

BRUCE LEHMAN

*Attesting Officer*  *Commissioner of Patents and Trademarks*